United States Patent [19]

Tomosada et al.

[11] Patent Number: 4,598,994
[45] Date of Patent: Jul. 8, 1986

[54] IMAGE FORMATION APPARATUS CAPABLE OF DIFFERENT IMAGE MAGNIFICATION

[75] Inventors: Masahiro Tomosada, Kawasaki; Katsuyoshi Maeshima; Tsuneki Inuzuka, both of Tokyo; Hisashi Sakamaki, Yokohama, all of Japan

[73] Assignee: Canon Kabushiki Kaisha, Tokyo, Japan

[21] Appl. No.: 434,222

[22] Filed: Oct. 14, 1982

[30] Foreign Application Priority Data

Oct. 22, 1981 [JP] Japan .................................. 56-69262

[51] Int. Cl.⁴ ............................................ G03G 21/00
[52] U.S. Cl. ..................................... 355/14 R; 355/55
[58] Field of Search ............... 355/14 R, 14 C, 14 CU, 355/3 R, 55, 56, 57

[56] References Cited

U.S. PATENT DOCUMENTS

| 4,300,829 | 11/1981 | Braswell et al. | 355/14 R |
| 4,327,994 | 5/1982 | Barley et al. | 355/14 R |
| 4,393,375 | 7/1983 | Sugiura et al. | 355/14 R |

*Primary Examiner*—R. L. Moses
*Attorney, Agent, or Firm*—Fitzpatrick, Cella, Harper & Scinto

[57] ABSTRACT

An image formation apparatus includes an input device that is used to enter a desired magnification factor for the image to be formed by the apparatus. If the apparatus is a copying apparatus, the input device can also be used to select the desired number of copies. The apparatus has a display device that displays to an operator the magnification factor. Control circuitry ensures that the display device shows the desired magnification factor.

11 Claims, 8 Drawing Figures

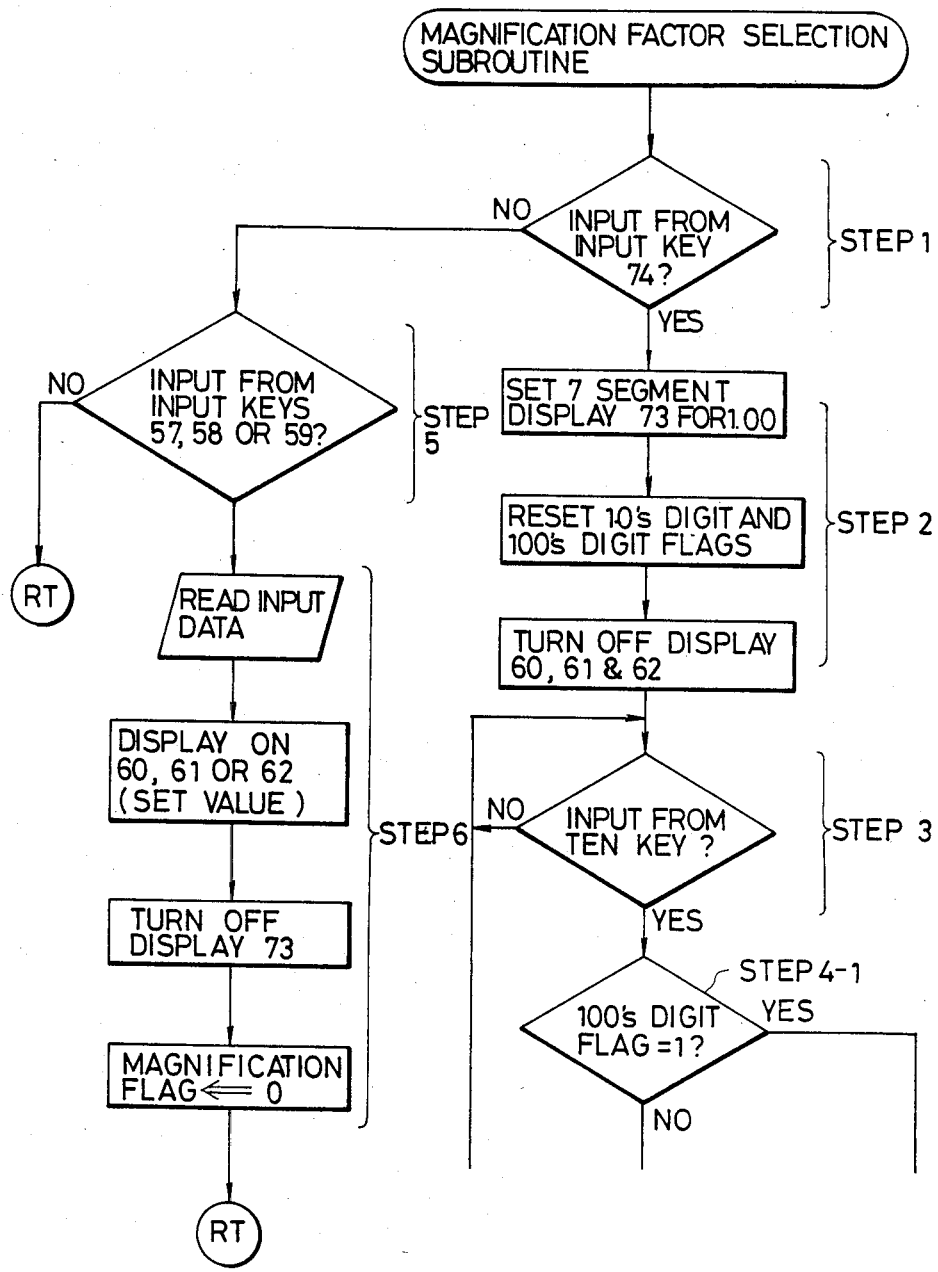

IMAGE FORMATION APPARATUS CAPABLE OF DIFFERENT IMAGE MAGNIFICATION

BACKGROUND OF THE INVENTION

1. Field of the Invention

This invention relates to an image formation apparatus having the magnification changing function.

2. Description of the Prior Art

It has heretofore been usual with image formation apparatus such as copying apparatus having the magnification changing function that the magnification factors are predetermined, and the following two methods have been common as the method of designating the magnification factors. One is a system of representing the conversion of paper size and determines the magnification factor by selecting a switch indicated as $\boxed{\text{A3 size} \rightarrow \text{A4 size}}$, as shown in FIG. 2 of the accompanying drawings. The other system determines the magnification factor by selecting a switch indicating the magnification factor as $\boxed{1:0.5}$, as shown in FIG. 3 of the accompanying drawings.

Means for selecting a pre-programmed and predetermined magnification factor has been possible where there are only several types of magnification factors, but in a system wherein even more magnification factors can be selected, a number of switches for selecting the magnification factors have been required and said means has been impossible in reality.

SUMMARY OF THE INVENTION

It is an object of the present invention to eliminate the above-noted disadvantage and to provide an image formation apparatus which is capable of selecting a variety of magnification factors.

It is another object of the present invention to provide an image formation apparatus which is easier to use.

It is still another object of the present invention to provide an image formation apparatus which is simple in construction when selecting the magnification factors.

The invention will become fully apparent from the following detailed description thereof taken in conjunction with the accompanying drawings.

DESCRIPTION OF THE PREFERRED EMBODIMENT

An embodiment of the present invention will hereinafter be described with reference to the drawings.

Figure 1:
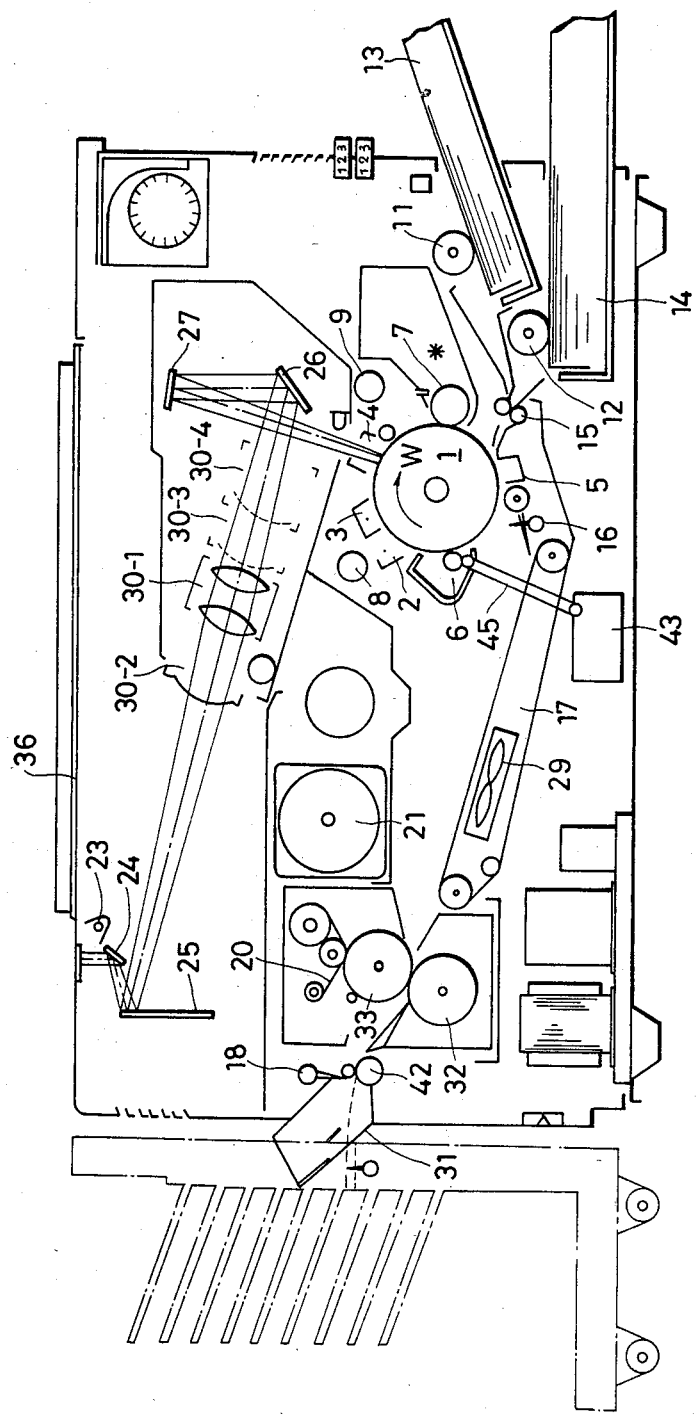
FIG. 1 is a cross-sectional view of a copying apparatus to which the present invention is applicable.

FIG. 1 is a cross-sectional view of a copying apparatus to which the present invention is applicable, and illustrates the structure and operation of the copying apparatus.

The surface of a drum 1 comprises a three-layer seamless photosensitive medium using a CdS photoconductive member. The drum 1 is rotatably supported on a shaft and starts rotating in the direction of arrow W by a main motor 21 operated by depression of a copy key.

When the drum 1 makes a predetermined angle of rotation and potential control processing (pre-processing) is terminated, an original placed on an original table glass 36 is illuminated by an illuminating lamp 23 made integral with a first scanning mirror 24 and the reflected light therefrom is scanned by the first scanning mirror 24 and a second scanning mirror 25. The first scanning mirror 24 and the second scanning mirror 25 are moved at a velocity ratio of $1:\frac{1}{2}$, whereby scanning of the original is effected with the length of the optical path forward of a lens 30 being kept constant.

The reflected light image passes through the lens 30 and via a third mirror 26 and a fourth mirror 27, whereafter it is image on the drum 1 at an exposure station.

The drum 1 is discharged simultaneously by a pre-exposure lamp 8 and a pre-discharging charger 2, whereafter it is corona-charged (for example, to the positive polarity) by a primary charger 3. Thereafter, at the exposure station, the drum 1 is slit-exposed to the image projected by the illuminating lamp 23.

Simultaneously therewith, the drum 1 is subjected to AC corona discharge or corona discharge opposite in polarity to the primary charge (for example, the negative polarity) by a secondary charger 4, whereafter the surface of the drum 1 is subjected to uniform exposure by a whole surface exposure lamp 9, whereby an electrostatic latent image of high contrast is formed on the drum 1. The electrostatic latent image on the photosensitive drum 1 is then developed into a visible toner image by the developing roller of a developing device 7, and the toner image is transferred to transfer paper by a transfer charger 5.

The transfer paper in an upper cassette 13 or a lower cassette 14 is fed into the apparatus by a paper feeding roller 11 or 12 are transported toward the photosensitive drum 1 with an accurate timing provided by register rollers 15, whereby the leading end of the latent image and the leading end edge of the paper can be registered to each other at a transfer station.

Then, the toner image on the drum 1 is transferred to the transfer paper as it passes between the transfer charger 5 and the drum 1.

After the completion of the image transfer, the transfer paper is separated from the drum 1 by a separating belt and directed to fixing rollers 32, 33 by a conveyor belt 17 through a paper detecting sensor 16, whereby the transferred image on the transfer paper is fixed by pressure and heat, whereafter the transfer paper is discharged onto a tray 31 by discharge rollers 42 through a paper detecting sensor 18.

Designated by 29 is a conveyor fan for reliably conveying the transfer paper. After the completion of the fixation, the fixing roller is cleaned by web 20.

After the image transfer, the drum 1 continues to rotate and has the surface thereof cleaned by a cleaning device 6 comprising a cleaning roller and an elastic blade, and the toner thus removed from the surface of the drum 1 is collected into a discharged toner container 43 by a pipe 45 and thus, the drum 1 becomes ready for the next cycle of copying operation.

Figures 2, 3, 4:
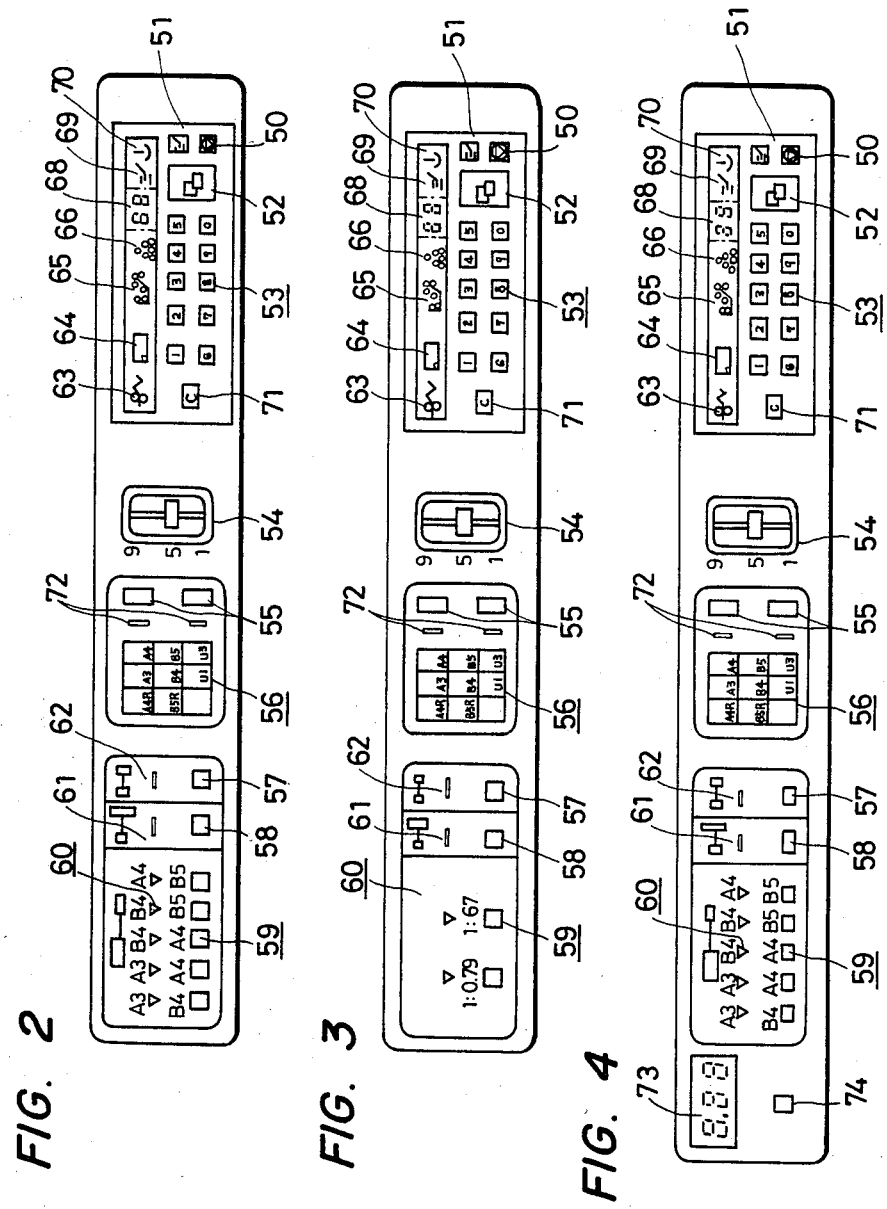
FIG. 2 is a plan view of the operating portion according to the prior art.
FIG. 3 represents size conversion by reduction rate conversion in the operating portion of FIG. 2.
FIG. 4 is a plan view of an operating portion to which the present invention is applicable.

FIG. 2 is a plan view of an operating portion.

In FIG. 2, reference numeral 55 designates a key for selecting the upper or the lower cassette, and reference 54 denotes a slide lever for setting the copy density and the position 5 in the slide lever indicates the standard density. The operating portion of FIG. 2 further includes digit keys 53 for setting the number of copies, a clear key 71 for cancelling the numerical values set by the digit keys, an interruption key 51 for executing another number of copies before the number of copies set by a key 53 is completed, a copy key 52 for instructing the start of copying, a stop key 50 for stopping the copying operation during a continuous copying operation for a set number of copies, keys 57, 58, 59 for selecting the one-to-one magnification copying, the enlargement copying and the reduction copying, respectively, and display devices 62 for displaying selected magnifications. The display device 60 displays the selected reduction copying mode, the display device 61 displays the selected enlargement copying mode, and the display device 62 displays the selected one-to-one magnificaiton copying mode. The enlargement includes a mode for converting A size into B size, and the reduction includes five modes provided by combinations of the reduction rates 1:0.67 and 1:0.79 and proper cassette selections. Display devices 72 display the upper and lower stages of the cassettes selected by cassette selecting keys, and a display device 56 displays the type of the cassette loaded on the selected stage. When a reduction key 59 is depressed, this display device 56 also displays a cassette in which the reduction size and the sheet size are in accord with each other when the selected cassette is not so. At the same time, the display device 56 also displays the size of the previously selected cassette statically.

Designated by 63–66 and 68–70 are warning display devices which all effect displays in pictorial characters. The display device 63 is a paper feed check-up display device adapted to be turned on when copying paper jams in the apparatus. The display device 64 is a paper/cassette supply display device adapted to be turned on when no cassette is present on the cassette table or when the paper in a cassette set on the cassette table has become exhausted. The display device 65 is a discharged toner fullness display device adapted to be turned on when a container 43 is full of the toner once used in the copying apparatus and collected. The display device 66 is a developer supply display device adapted to be turned on when the developer in the developing device becomes less than a prescribed amount.

Designated by 70 is a wait display device adapted to be turned on when the main switch is closed and the temperature of the fixing heater is lower than a prescribed value and to be turned off when the temperature of the fixing heater becomes higher than the prescribed value and the wait up processing has been terminated.

Denoted by 68 is a copy number display device. When a desired number of copies is set by a ten key 53, the display device 68 displays the set number by seven segments. 1 to 99 sheets can be set at a time. The copy number display device 68 is automatically reset to 01 after the lapse of about 60 seconds after the completion of the copying, or from the set number of copies by the clear key 71 or the interruption key 51. Reference numeral 69 designates an interruption display device adapted to be turned on when the interruption key 51 is depressed and to be turned off after the interruption has been terminated.

FIG. 3 shows an operating portion designed to represent the size conversion shown in FIG. 2 in reduction rate conversion in the switch for selecting the reduction copying mode. In FIG. 3, members functionally similar to those of FIG. 2 are given similar reference numerals.

FIG. 4 is a plan view of the operating portion of the copying apparatus in the present embodiment. The differences of this operating portion from the operating portions shown in FIGS. 2 and 3 are a 7-segment display device 73 and a switch 74. The switch 74 is a switch for changing over the function of inputting a desired number of copies by the ten key 53 and the function of inputting a desired reduction rate by the ten key 53. In FIG. 4, members functionally similar to those of FIG. 2 are given similar reference numerals.

Figure 5:
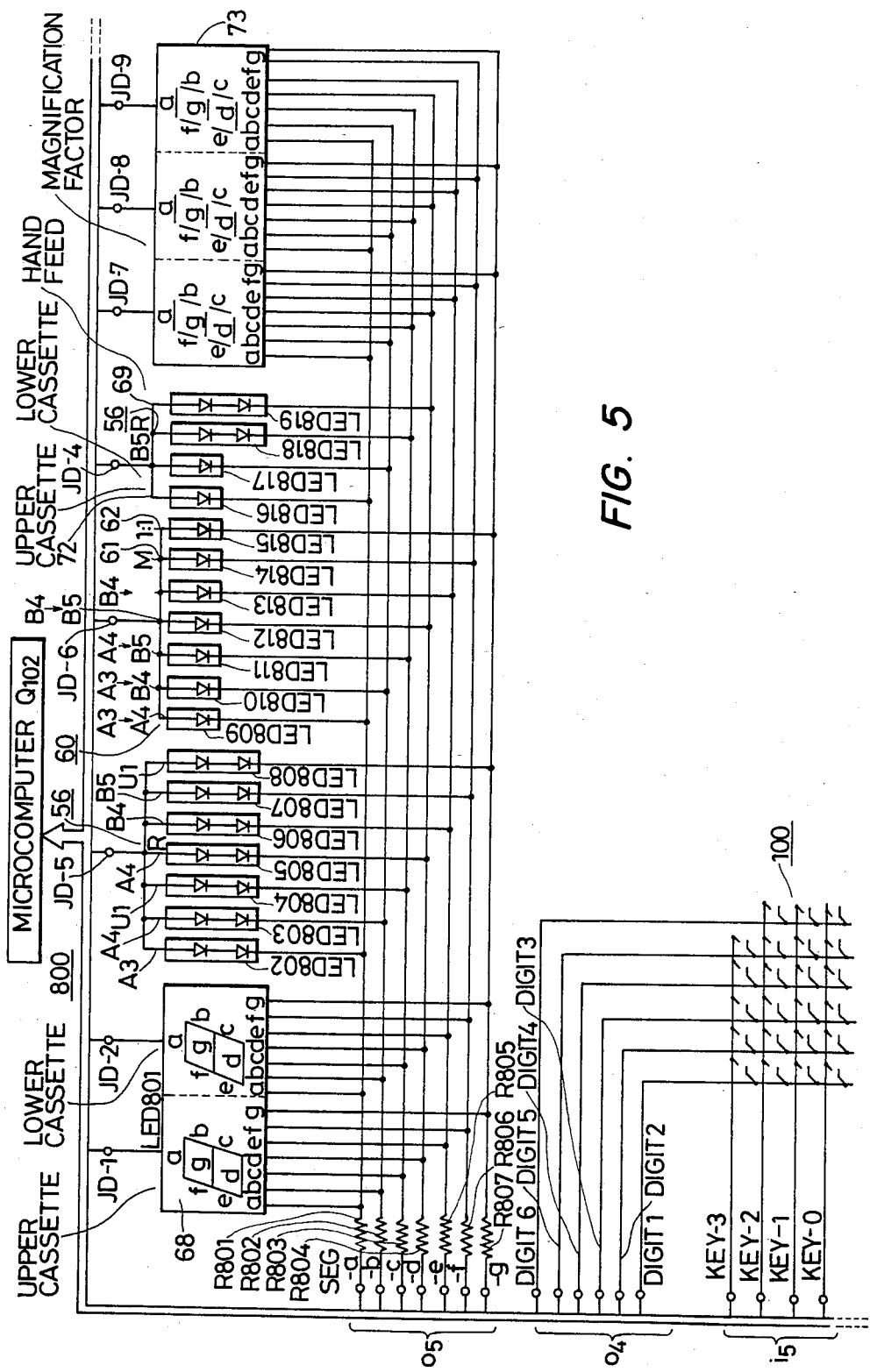
FIG. 5 is an electrical circuit diagram showing the circuit of the main display devices and input keys of FIG. 4.

FIG. 5 shows a circuit of the main display devices and input keys of FIG. 4 which is turned on and controlled by a microcomputer Q102. The display devices are designed to be dynamically turned on, and JD1–JD9 are designed to be driven by digit driving signals so that a designated display device is turned on by a combination of the digit driving signals with segment signals SEG-a–SEG-g. The circuit is also designed to read the input data by key-scan-controlling a key matrix 100 by the microcomputer Q102.

That is, in the construction of the matrix, the conditions of keys are read by key scan signals Digit 1–Digit 6 through signals KEY 0–KEY 3 input to a port 15. The key inputs and the display thereof are a known technique and need not be described in detail.

Figure 6:
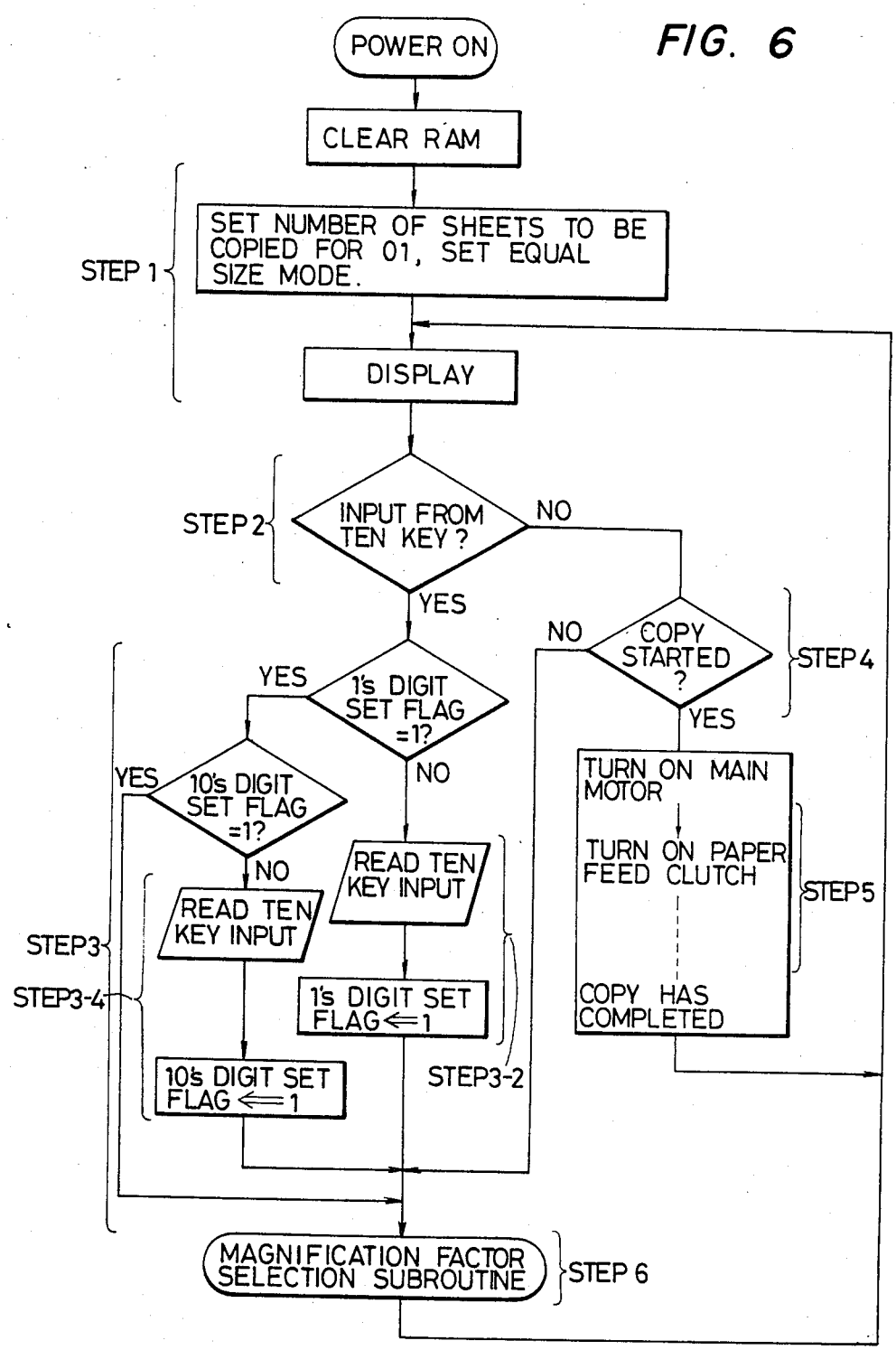
FIG. 6 is a main control flow chart of a copying apparatus according to an embodiment of the present invention.
Figure 7B:
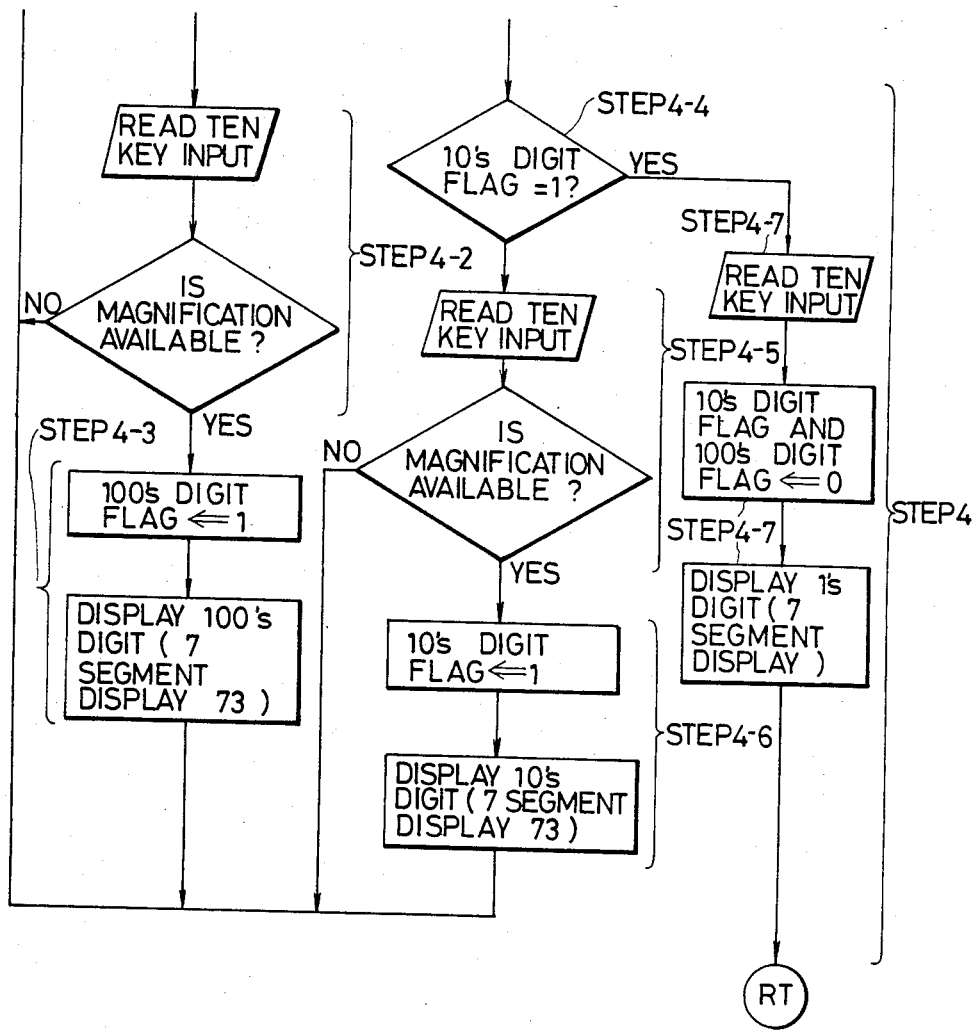
FIG. 7 composed of FIGS. 7A and 7B is a subroutine flow chart for selecting the magnification factor.

Description will now be made of the main control operation in the present embodiment. The flow charts of FIGS. 6 and 7 are programmed and stored in the ROM within the microcomputer Q102 of FIG. 5. The microcomputer Q102 may be a well-known one-chip microcomputer such as, for example, $\mu$PD1511 produced by Nippon Electric Co., Ltd.

The flow chart of FIG. 6 shows the main operations of the copying apparatus according to the present embodiment. FIG. 6 will hereinafter be described.

At step 1, the content of the RAM in the microcomputer Q102 is cleared after the main switch is closed. Also, the number of copies is set to 01 and the copy mode is set to the one-to-one magnification mode. It is displayed by the display device. At step 2, whether the input from the ten key exists is judged and, when the input from the ten key exists, the numerical value is read at step 3. If, at step 3-1, the 1's digit set flag is not set to "1", the input from the ten key 53 is read at step 3-2 and the 1's digit set flag is set to "1". If the 1's digit set flag is set to "1" at step 3-1, whether the 10's digit set flag is set to "1" is confirmed at step 3-3. If the 10's digit set flag is not set to "1", the input from the ten key 53 is read at step 3-4 and the 10's digit set flag is set to "1". That is, at step 3, the number of copies is set. If the input from the ten key does not exist at step 2, whether copying is to be started is judged at step 4 and, if copying has been started, a series of copying operations are effected at step 5. If copying is not to be started, the program proceeds to step 6, namely, the magnification factor selection subroutine.

FIG. 7 shows the magnification factor selection subroutine for selecting the magnification factor. FIG. 7 will hereinafter be described.

When the magnification factor is provided by the use of the ten key, the ten key is used only to provide and display the magnification factor by depressing a switch 74 at step 1. At step 2, 1.00 is displayed by a display device 73 and the magnification factor is set to 1. Also, the 10's and 100's digit flags are reset to "0". The display device 60 for displaying the reduction copying mode, the display device 61 for displaying the enlargement copying mode and the display device 62 for displaying the one-to-one magnification copying mode are turned off.

At step 3, whether there is an input from the ten key 53 is judged, and the program waits until there is such input. At step 4, the 100's digit data is provided by the ten key 53 and if it is an input which can effect magnification change, that data is displayed.

At step 4-1, whether the 100's digit flag is set to "1" is judged and, if it is not set so, the input from the ten key is read at step 4-2 and whether it is a acceptable value is judged. If the answer is yes, the 100's digit flag is set to "1" at step 4-3 and that data is displayed at the 100's digit display. If the 100's digit flag is not set to "1" at step 4-1, the program shifts to step 4-4 and whether the 10's digit flag is set to "1" is judged. If it is not set to "1", the input from the ten key is read at step 4-5 and whether it is acceptable is judged on the basis of the 100's digit data. If it is acceptable, the 10's digit flag is set to "1" at step 4-6 and that data is displayed at the 10's digit. In the case of YES at step 4-4, the input from the ten key is read at step 4-7 and the 10's and 100's digit flags are reset to "0", and the input data is displayed at the 1's digit.

For example, a copying apparatus wherein the magnification factor can be changed up to 2.00-0.05 is programmed so that only 0.1 and 2 can be read and the other data are not accepted as the 100's digit. Accordingly, the user can know whether a numerical value can be magnification-changed. The 10's digit data is likewise processed on the basis of the 100's digit data and, when the 1's digit data is provided to input, the 100's digit data is displayed and the process returns to the flow chart of FIG. 6. That is, once the switch 74 is depressed, the ten key 53 cannot be used to set the number of copies or to set a new magnification factor as long as all of the 100's digit to the 1's digit do not be provided.

Also, by selecting the reduction key 59 or the enlargement key 58 at step 5 without depressing a no-stage magnification change switch at step 1, a pre-programmed magnification can also be selected. Also, if the one-to-one magnification key 57 is selected, the one-to-one magnification copying mode will be assumed. Program is made such that for example, if the key A3→B4 is selected in the reduction key 59, a pre-programmed magnification factor 0.79 is selected at step 6 and the lamp A3→B4 of the display device 60 is turned on to indicate that input has been made and the display device 73 is turned off.

The present invention is not restricted to a copying apparatus but is applicable to various image formation apparatus.

As has been described above, the present embodiment can select and display a variety of magnification factors and therefore not only can be readily used but also can obtain variable magnification images suitable for the user's purposes. Further, according to the present embodiment, the key for setting the number of copies and the key for setting the magnification factor are identical, and this leads to a simple construction and a reduced cost.

Also, according to the present embodiment, whether the magnification factor to be input is irrational can be simply discriminated and this is convenient to the user who does not know to what extent the magnification factor can be input.

Furthermore, according to the present embodiment, magnification factors are represented by numerical values and are therefore not only easy to see but also even fine copying magnifications can be selected, and this leads to the possibility of obtaining transferred images of a desired magnification without being puzzled by the size of the original or the size of the transfer paper.

The present invention is not restricted to the above-described embodiment but various modifications may be made thereto.

What we claim is:

1. An image formation apparatus comprising:
input means for entering a desired magnification factor and a desired number of sheets of copy;
display means for displaying said magnification factor; and
control means for controlling said display means so that said display means displays said magnification factor according to said input means, said control means including discriminating means for discriminating whether or not the magnification factor entered from said input means is within a predetermined range.

2. An image formation apparatus according to claim 1, further comprising a switch for changing over the setting of the magnification factor or the number of sheets of copy, according to said input means.

3. An image formation apparatus according to claim 1, further comprising selecting means for selecting a preset magnification factor.

4. An image formation apparatus according to claim 1, further comprising display means for displaying said number of sheets of copy.

5. An image formation apparatus according to claim 1, wherein said control means inhibits display of said magnification factor when the magnification factor entered from said input means is outside of said predetermined range.

6. An image formation apparatus according to claim 1 wherein said display means is a numerical display device.

7. An image formation apparatus comprising;
input means for entering a desired magnification factor;
display means for displaying said magnification factor; and
control means for controlling said display means to display said magnification factor according to said input means;
said control means including discriminating means for discriminating whether the magnification factor entered from said input means is within a predetermined range or not.

8. An image formation apparatus according to claim 7, wherein said control means inhibits display of said magnification factor when the magnification factor entered from said input means is outside of said predetermined range.

9. An image formation apparatus according to claim 7, wherein said display means is a numerical display device.

10. An image formation apparatus according to claim 7, further comprising selecting means for selecting a preset magnification factor.

11. An image formation apparatus comprising:
input means for entering a desired magnification factor;

display means for displaying said magnification factor; and control means for controlling said display means so that said magnification factor is numerically displayed according to the input from said input means only when the magnification factor entered by said input means is within a predetermined range.

* * * * *